Oct. 25, 1932.   H. S. HASSELQUIST   1,883,906
METHOD OF ATTACHING NUTS TO METAL PLATES
Filed May 5, 1930

INVENTOR.
Hugo S. Hasselquist
BY
ATTORNEY.

Patented Oct. 25, 1932

1,883,906

UNITED STATES PATENT OFFICE

HUGO S. HASSELQUIST, OF MILWAUKEE, WISCONSIN, ASSIGNOR TO A. O. SMITH CORPORATION, OF MILWAUKEE, WISCONSIN, A CORPORATION OF NEW YORK

METHOD OF ATTACHING NUTS TO METAL PLATES

Application filed May 5, 1930. Serial No. 449,828.

This invention relates to a method of attaching nuts to metal plates.

The object of the invention is to provide a method of attaching nuts to metal plates whereby the nut is interlocked with the plate and prevented from rotating relatively thereto.

The accompanying drawing illustrates embodiments of the invention and the views therein are as follows.

Figure 1:
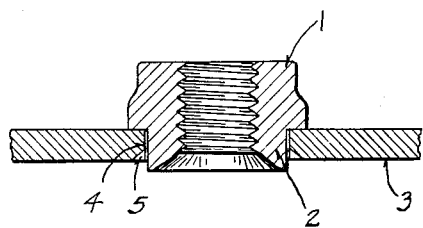
Fig. 1 is a transverse section through the nut and plate after the projection of the nut has been inserted into the opening of the plate and prior to interlocking the same.

In carrying out the invention, the nut 1 is provided with a cylindrical or circular projection 2 extending in axial alignment with the threaded bore of the nut. The projection 2 is preferably of smaller cross section than the body of the nut and is adapted to be deformed at its end to interlock the nut with the plate 3.

The plate 3 is provided with a circular opening 4 for receiving the projection 2 of the nut. On the underside of the plate the metal of the edge of the opening is deformed to provide serrations 5 therein.

Figure 2:
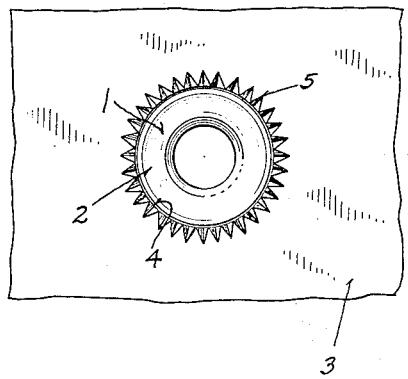
Fig. 2 is a bottom view of the plate showing the projection of the nut as illustrated in Fig. 1.
Figure 3:
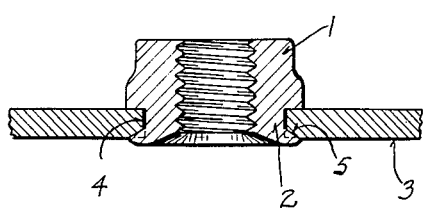
Fig. 3 is a section similar to Fig. 1 showing the nut in interlocking engagement with the plate.

After the parts have been assembled, as shown in Figs. 1 and 2, the end of the projection 2 of the nut is bent radially outwardly and upwardly against the plate 3 to rivet the nut to the plate. In this operation, the metal of the projection 2 is pressed into the recesses in the serrated edge of the plate 3 so as to interlock the nut with the plate in a manner to prevent relative turning thereof.

Figure 4:
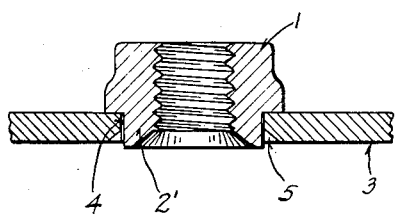
Fig. 4 is a section similar to Fig. 1 showing a modified form of nut.
Figure 5:
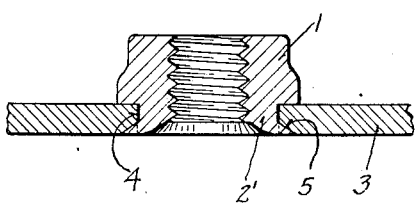
Fig. 5 is a section similar to Fig. 3 illustrating the modified form of nut.

The invention as above set forth has been found to be especially applicable to the fastening of nuts to parts of automobile frames or bodies for the purpose of securing brackets such as those for the support of extra tires and other accessories.

Where the invention is to be applied to the securing of two metal plates together, it may be desirable to make the projection of the nut flush with the serrated side of the plate. In this case, the modification illustrated in Figs. 4 and 5 may be employed. In the modified form, the projection 2' of the nut is made much shorter, and in the assembling of the parts the projection is expanded into the serrations of the plate and flush with the plane of the plate so as to prevent any obstruction from interfering with the joining of the plate to another plate member.

The invention may have various modifications within the scope of the accompanying claims.

I claim:

1. A method of attaching a nut to a plate-like member which comprises perforating said plate-like member to provide a circular opening therein, providing serrations on one side of said member in the edge portion thereof surrounding the perforation, applying a nut to the opposite side of the member with a circular projection complementary to the opening in said member extending through said opening, and deforming the end of the projection of said nut to engage the serrations of the plate-like member to thereby interlock the nut with the member and prevent relative rotation thereof.

2. A method of attaching a nut to a plate-like member which comprises perforating said plate member, providing a plurality of adjoining serrations on one side of said member in the edge portion thereof surrounding the perforation, applying a nut to the opposite side of the member with a projection of the nut extending through the perforation in the member, and bending the end of the projection radially outwardly to rivet the nut to the plate member and to cause the metal of said projection to engage the serrations in said plate-like member and thereby prevent relative rotation therebetween.

3. A method of attaching a nut to a plate which comprises, forming the nut with a depending cylindrical shank longer than the thickness of the plate the end of the shank being dished to provide a marginal edge that may be spread outwardly, perforating the plate to receive the shank, serrating the edge of the plate surrounding the shank, inserting the shank in the perforation, and spreading the marginal edge of the shank outwardly to engage the serrations in the plate and lock the nut against rotation relative to the plate.

4. A method of attaching a nut to a plate which comprises, forming the nut with a depending cylindrical shank longer than the thickness of the plate, the end of the shank being hollowed to provide a marginal edge that may be spread outwardly, perforating the plate to receive the shank, forming serrations in the edge of the plate surrounding the perforation such that the recesses between adjacent serrations will receive the marginal edge of the shank, inserting the shank into the perforation from the side opposite the serration, and spreading the marginal edge of the shank outwardly into the recesses between serrations flush with the surfaces of the plate.

In witness whereof I have hereunto subscribed my name at Milwaukee, Wisconsin, this 2nd day of May, 1930.

HUGO S. HASSELQUIST.